Patented Nov. 18, 1941

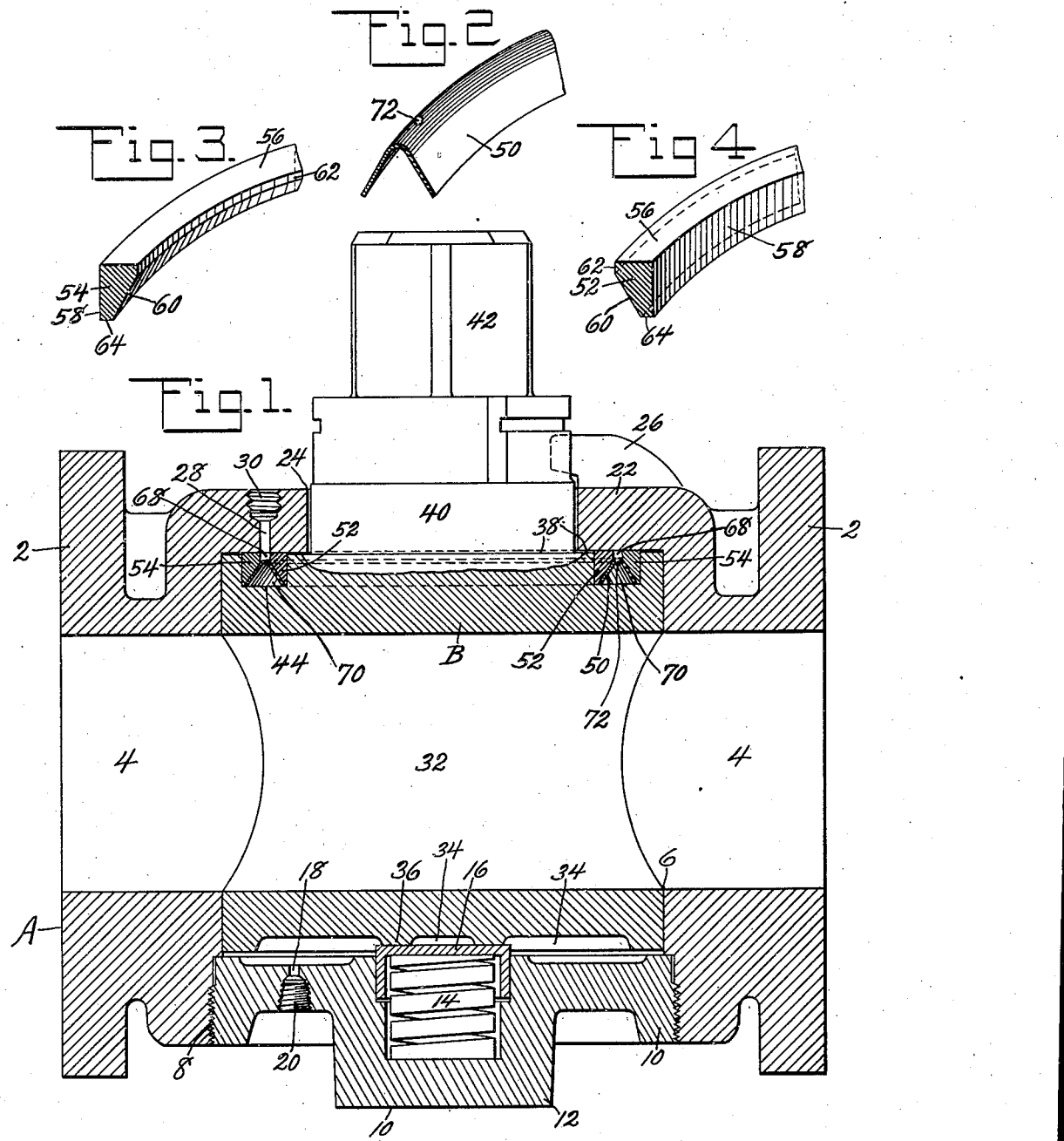

2,263,454

UNITED STATES PATENT OFFICE 2,263,454

FLUID SEALED VALVE

Robert Clade, Detroit, Mich., assignor to American Car and Foundry Company, New York, N. Y., a corporation of New Jersey Application January 30, 1940, Serial No. 316,421

7 Claims. (Cl. 286—9)

This invention relates to valves in general and in particular to fluid sealed valves of the plug type.

In recent years where it has been necessary to seal valves against leakage while providing easy operation thereof plug valves of the lubricated type have been utilized, but in controlling certain substances it is impossible to utilize the lubricated type of valve; that is, in controlling the flow of certain substances, such as the modern plastics or any product which must be kept chemically pure, grease or other similar sealing and lubricating material cannot be used. Lubricated valves of the type now used occasionally develop leaks and it is practically impossible to prevent such leakage, particularly if the valve is not properly tended and the lubricant becomes low due to wash out or to frequent operation of the valve. In controlling the flow of certain substances, such as chlorine, certain of the acids, and certain of the constituents of modern plastics, it is absolutely necessary that no leakage occur for if any leakage occurred human life would be endangered or products spoiled through contamination. It is an object, therefore, of the present invention to provide a fluid sealed valve to control the flow of any substance, the escape of any of which would endanger human life or contaminate other substances.

A further object of the invention is the provision of an improved fluid sealed valve to control the flow of any substance which would be damaged by contact with air or by contact with grease or any similar material.

A still further object of the invention is the provision of an improved fluid sealed valve in which the seal is provided by means of fluid under pressure.

These and other objects of the invention will be apparent to persons skilled in the art from a study of the following description and accompanying drawing, in which:

Figure 1 is a sectional view taken substantially on the center plane of the valve and with the valve in open position;

Fig. 2 is a fragmentary perspective view of the metallic sealing ring or lift element, and Figs. 3 and 4 are fragmentary perspective views of the outer and inner sealing rings.

Referring now to the drawing in detail, it will be seen that a valve of the plug type has been disclosed having a body A and plug B, but it is to be understood that the invention is not limited to plug valves but may be applied to other types of valves. The valve body is formed with any suitable attaching means, such as flanges 2, by which the valve may be attached to the adjacent piping or fitting and is formed also with the customary passageway bore 4 positioned substantially at right angles to the plug receiving bore 6. The plug receiving bore has its diameter increased as at 8 and internally threaded to receive a base cap 10, which is formed with a central projection 12 adapted to receive externally a wrench or other tool by means of which the cap may be tightly screwed into position in the enlarged portion of the plug receiving bore. The base cap projection just referred to has its central portion removed to provide a recess for reception of a spring 14 and a combined spring cap and bearing member 16. The base cap is formed adjacent the projection with a passageway 18 extending through the cap and threaded as at 20 adjacent its outer end to receive a pipe fitting or a plug whichever may be desirable.

The top or head portion of the plug receiving bore is closed by the top wall 22 having its central portion bored out to provide an opening 24, having its axis substantially coinciding with the axis of the plug receiving bore. A limiting projection 26 may be cast or otherwise attached to the valve body and adapted to partially overlap the opening 24 just referred to. It is, of course, obvious that the surfaces of the plug receiving bore and the inner surface of the head portion will be machined to provide perfectly smooth bearing surfaces. The head portion is formed with a passage 28 extending therethrough and having its outer end threaded as at 30 to receive a length of pipe or a pipe fitting (not shown).

The valve plug consists of a substantially cylindrical lower portion traversed by a bore 32 adapted to be aligned with the bore in the valve body when the valve is in open position. The lower end of the cylindrical plug has parts thereof removed as at 34 to provide an inner annular bearing ring 36 adapted to rest upon the spring cap and bearing member 16 previously referred to. The removal of the metal as at 34 from the plug insures the existence of a space between the cap and plug base, which space may be filled by fluid entering through the passage 18 in the base cap. The upper end of the plug is formed with a shoulder portion 38 adapted to be overlapped by the head portion of the valve body and with a stem portion 40 adapted to extend through the opening 24 in the head portion. This stem portion is formed with a squared or other shaped end 42 adapted to receive a wrench, gear or any other suitable operating means for turning the plug in the valve body. The plug shoulder portion 38 has its surface interrupted by means of a groove 44 of substantial depth and preferably of rectangular cross section, although some other cross section may be found more suitable.

In order to effectively seal the joint between the head 22 and shoulder 38 a multi-part mechanical seal is provided. This seal consists of an annular metallic ring 50 of V cross section and is preferably made of a relatively thin metal capable of slight springing movements. This metallic ring is placed in the groove 44 with the apex upwardly, that is, in inverted position, thus producing two downwardly diverging surfaces, the inner of which is adapted to support an inner resilient ring 52, while the outer surface similarly supports the outer resilient ring 54. Each of these resilient rings is formed with a relatively wide upper surface 56, a relatively wide outer surface 58 and a tapered inner wall 60. This tapered wall is joined to the upper wall and outer side walls by means of upper and lower short connecting portions 62 and 64 respectively. As clearly shown in Figure 1 the tapered walls 60 cooperate with and rest directly upon the downwardly diverging surfaces of the metallic supporting ring and the combined width of the upper surfaces is less than the width of the slot 44, thereby providing an annular space 68 directly below the passage 28 extending through the head of the valve body. In order to connect the annular space 68 formed by the resilient rings and the apex of the metallic ring with the space 70 inclosed between the metallic ring and the bottom of the plug groove, small holes 72 are formed in the apex of the metallic supporting ring. These holes may be of any desired number and size but are preferably of sufficient number and size as to permit an immediate equalization of pressure between the spaces 68 and 70. The resilient rings 52 and 54 are so formed that when assembled in the plug groove they project slightly above the surface 38 and thus will be slightly compressed against the metallic ring when the plug is assembled in the body and this compression will be maintained by the spring 14 in the base cap of the valve. Compression of the resilient rings will cause a slight flow of the material toward the annular space 68 and will at the same time slightly deflect the metallic supporting or lifting ring 50. The resilient rings are preferably made of rubber, or any other resilient material such as Neoprene which is manufactured by the E. I. Du Pont de Nemours Company of Wilmington, Delaware, and it is apparent that as the surfaces 56 wear away, the resiliency of the material will constantly hold the ring against the inner surface of the valve body head, thus preventing any initial leaks.

The mechanical seal formed by the rubber and metallic rings is supplemented by a fluid seal obtained by forcing into the spaces 58 and 70 any inert fluid such as nitrogen, argon or an inactive liquid which does not have an affinity for the product being controlled by the valve. The fluid pressure is applied through the passage 28 to the annular space 68 and through the holes 72 to the space 70 beneath the metallic ring. Preferably the fluid is supplied by a large source, thus insuring a substantially constant predetermined pressure of fluid to the seal. It will be obvious that the fluid pressure will supplement the mechanical compression and will act on surfaces 62 to force the resilient rings against the side walls of the plug groove and will also lift the metallic ring upwardly causing it to act as a wedge and further force the rings into tight engagement with the side walls of the plug groove. The initial compression placed in the resilient rings will, of course, be supplemented by the lifting effect of the metallic ring due to the fluid pressure, thereby tightly jamming the surfaces 56 of the resilient rings against the inner surface of the valve body head. It will be obvious that wherever the fluid can act on both surfaces of the metallic ring, no lifting effort is obtained, therefore, by proper choice of the surfaces 60 various fluid lifting efforts may be obtained; but in any case the walls 60 must closely contact the upper surfaces of the metallic ring in order that the fluid pressure when applied will snap the metallic ring upwardly before any fluid can leak between the surfaces 60 and the adjacent surface of the metallic lifting ring. It will be apparent from the drawings that the fluid pressure in the annular space 68 will expand the resilient rings and positively prevent any leakage occurring between the surfaces 38 of the plug and the inner surface of the valve body head, thus there can be no head leaks. In handling certain substances it is also desirable to positively prevent any possible leakage or infiltration of air at the base of the valve and this can be accomplished by connecting the passage 18 in the cap to the same or a similar source of fluid pressure as that which is connected to the passage 28 in the head portion. With the fluid pressure applied to both the head and base portions of the plug, it will be impossible for any substance flowing through the valve to escape from the valve at the plug bore. As was previously referred to, the fluid supplied under pressure, whether it be gaseous or liquid, should be derived from a source containing an inert fluid, for thus human life cannot be endangered, nor can the product controlled by the valve be contaminated.

While the improved valve has been described more or less in detail, it is obvious that various modifications and rearrangements of parts will suggest themselves to persons skilled in the art but all such modifications and rearrangements of parts are contemplated as will fall within the scope of the appended claims defining my invention.

What is claimed is:

1. In a valve of the rotary plug type wherein a valve body is provided with a head and a rotatable plug is mounted in the body in a manner to provide overlying annular surfaces which are normally urged together and one of which is formed with an annular groove, a V-shaped relatively thin spring ring arranged in said groove with its apex adjacent said annular surfaces, ring members having angular faces supported by each side of said V-shaped ring member, and means for feeding an inert gas under pressure within the V-shaped ring member to cause the latter to expand to urge the outer ring members into contact with the overlying annular surface.

2. In a valve of the rotary plug type having a body provided with a head and a plug rotatably arranged in said body and formed with an annular groove in its upper end portion adjacent said head, sealing means for said valve comprising a substantially V-shaped ring member of relatively thin resilient metal arranged in said annular groove, spaced resilient rings in said groove and supported by the arms of said V-shaped ring member, and a fluid medium under pressure in said V-shaped ring member acting to expand said arms to cause said resilient rings to move into sealing contact with the head of the valve body.

3. In a valve of the rotary plug type, a housing having a wall, a shaft rotatably mounted in said housing and extending through said wall, the shaft being formed with a shoulder including an annular portion adjacent said wall, means for sealing between the housing and annular portion including a pair of outer ring members seated in an annular groove in the annular portion, said ring members having outer end portions normally engaging the adjacent housing and diverging angular inner opposed faces, a spring ring including wing portions normally engaging said angular faces, and means for feeding an inert gas under pressure against the inner faces of said wing portions to cause said outer ring members to form a seal with said housing.

4. In a valve of the rotary plug type wherein a valve body is provided with a head portion and a rotatable plug is mounted in the body in a manner to provide overlapping annular surfaces, the annular surface on said plug being provided with an annular groove, an inner spring ring seated in said groove and including spaced converging flexible annular wall portions, resilient ring members engaging the wall portions of said spring ring, said resilient ring members having their outer and inner walls conformed to the adjacent wall of said annular groove and the annular wall portion of said spring ring respectively, and means for feeding an inert gas under pressure between the flexible wall portions of the inner spring ring to cause said spring ring to exert a constant pressure against said resilient ring members to urge the latter into sealing engagement with said head portion.

5. In a housing including a wall and a shaft rotatably mounted in said housing, said shaft being formed with a shoulder adjacent to said wall to provide adjacent surface portions one of which is formed with an annular groove positioned axially of said shaft, spaced resilient annuli arranged in said groove in substantially the same plane, a V-shaped annulus of spring metal supporting said resilient annuli, and means for feeding an inert gas under pressure against the inner concave face of said V-shaped annulus to force said annuli into sealing contact with said wall.

6. As an article of manufacture, annular packing means of generally rectangular cross-section and comprising a pair of resilient annular rings of different diameters, and a V shaped annular metal ring supporting said resilient rings, said resilient rings being generally triangular in cross-section and arranged with the hypothenuse of each converging toward the base portions and supported by the sides of the metallic ring.

7. As an article of manufacture, packing means for valves comprising a pair of resilient annuli arranged in substantially the same plane, and a V shaped annulus of spring metal supporting said resilient annuli, said resilient annuli being of generally triangular cross-section with the hypothenuse of each supported upon the sides of the V shaped annulus.

ROBERT CLADE.